United States Patent [19]

Carcerano

[11] Patent Number: 5,764,991
[45] Date of Patent: Jun. 9, 1998

[54] PROCESSING OBJECT ORIENTED CODE AND VIRTUAL FUNCTION CODE

[75] Inventor: Christopher John Carcerano, Laguna Hills, Calif.

[73] Assignee: Canon Kabushiki Kaisha, Tokyo, Japan

[21] Appl. No.: 497,082

[22] Filed: Jun. 30, 1995

[51] Int. Cl.⁶ ................................. G06F 9/45; G06F 9/44
[52] U.S. Cl. ........................... 395/705; 395/710; 395/685
[58] Field of Search ................................. 395/705, 710, 395/685

[56] References Cited

U.S. PATENT DOCUMENTS

| | | | |
|---|---|---|---|
| 5,297,284 | 3/1994 | Jones et al. | 395/700 |
| 5,327,562 | 7/1994 | Adcock | 395/700 |
| 5,375,242 | 12/1994 | Kumar et al. | 395/700 |
| 5,421,016 | 5/1995 | Conner et al. | 395/700 |
| 5,442,793 | 8/1995 | Christian et al. | 395/700 |
| 5,515,536 | 5/1996 | Corbett et al. | 395/700 |

FOREIGN PATENT DOCUMENTS

| | | | |
|---|---|---|---|
| 0546809 | 6/1993 | European Pat. Off. | G06F 9/44 |
| 9501598 | 1/1995 | WIPO | G06F 9/44 |

OTHER PUBLICATIONS

"Powerful Pointers to Member Functions", Christopher Skelhg, C/Ctt Users Journal Oct. 1994 v12 No. 10 p. 51(9).

"Object–oriented Analysis and Design with applications", Grody Booch, The Benjamin/Cummings Publishing Company, 1994, pp. 480–481.

Primary Examiner—Emanuel Todd Voeltz
Assistant Examiner—Kakali Chaki
Attorney, Agent, or Firm—Fitzpatrick, Cella, Harper & Scinto

[57] ABSTRACT

In an arrangement for converting an instruction code set in a first object oriented language to an instruction code set in a second object oriented language, the sequence of instruction codes from the first object oriented language is parsed to detect codes including predetermined constructs. The constructs of the detected code are automatically modified to be allocation and initiation constructs in the second object oriented language and a table of reference codes pointing to the modified instruction codes is generated so that jump tables are formed for stand alone code resources.

44 Claims, 7 Drawing Sheets

PROCESSING OBJECT ORIENTED CODE AND VIRTUAL FUNCTION CODE

BACKGROUND OF THE INVENTION

1. Field of the Invention

The invention relates to computer code compilation and more particularly to an arrangement for compiling virtual functions in object oriented code structures.

2. Description of the Related Art

As is well known, object oriented programming languages utilize structures based on classes which relate the characteristics of programming objects and sub-classes which have the same characteristics of the class. For example, a class of shapes may relate to geometric features of objects. Ellipses form a sub-class of shapes and circles form a sub-class of ellipses. Polygons form a separate sub-class of shapes different than ellipses. Rectangles form a sub-class of polygons and squares constitute a sub-class of rectangles. While each sub-class has the characteristics of the class from which it is derived, it also has special characteristics which must be taken into consideration when processing is performed. Since the classes and the sub-classes have common characteristics, some of the functions performed in a process such as drawing are the same. The special characteristics of each class, however, require that other functions in the drawing process be specifically designed for the class.

In object oriented programming, a function or method of a class may be inherited by its sub-classes. Advantageously, a change in a function of one class can then be applied to all of the sub-classes. If a function relates only to a sub-class, it must be applied only to that sub-class. In the case of drawing shapes, the same function for calculating the area of objects may be used in all sub-classes of shapes but the function of drawing the shape in the sub-classes may be different. Object oriented programming includes the feature of polymorphism wherein functions in a class that are not inherited from another class are changed to account for the special characteristics of the class (i.e., virtual functions) so that processing of the virtual function differs from that of the function that is directly inherited.

In compiling instruction codes in an object oriented language such as C++, it is necessary to translate source instruction codes of the C++ language to instruction codes in the C object oriented language. The translation must include allocation and initiation of virtual function tables (i.e., v-tables) for the virtual functions declared in each class to provide the set of codes needed for the different processing of the virtual functions. Virtual function tables are arrays of function pointers that point to global variables. Referencing of virtual functions in an application program is performed by ascertaining offsets from a reference memory location of the application (e.g., A5 world in the Macintosh environment). Similar offsets from a reference memory location are provided in the Windows and DOS environments.

Stand alone code resources are often used in programming applications so that a code segment for a header or a driver separate from but used in many applications may be processed as part of an application. The stand alone code resources are code modules that are not part of an application and therefore do not have a reference memory location such as in the A5 world. Accordingly, linkers must be used to locate the stand alone code resource. The linkers operate to generate jump tables which include detailed information on the location and size of each function. Linking arrangements known in the art, however, have not been performed automatically but have required special processing. The article "Polymorphic Code Resources in C++" by Patrick C. Beard, appearing in Apple Develop, October 1990, pages 400–412 discloses methods for including stand alone code resources in an application in which a separate specialized program is provided for each of the several types of stand alone code resources to link these code resources in the application. Alternatively, manual intervention has been required to process instruction codes of inherited classes that are compiled by translation from object oriented source code. Accordingly, the incorporation of stand alone code in stored instruction sets for computer application programs has been an expensive and time consuming task.

SUMMARY OF THE INVENTION

It is an object of the invention to provide an arrangement for automatically compiling instruction codes from an object oriented language that includes virtual functions and stand alone code resources.

The invention is directed to processing instruction records of an object oriented language in which a sequence of instruction records of the language are read and instruction codes in the sequence that contain a predetermined construct are detected. Each detected instruction recorded is replaced by a set of replacement instruction records including storage location codes and a table of codes pointing to the storage locations is generated responsive to the replacement instruction records.

In accordance with one aspect of the invention, each detected instruction record is a global variable record.

In accordance with another aspect of the invention, the generated table of codes pointing to storage locations includes codes pointing to storage locations of virtual functions of the global variables.

In accordance with yet another aspect of the invention, the replacement instruction records include allocation instruction codes that allocate tables for the virtual functions of the global variables.

A more complete understanding of the invention can be obtained by reference to the following detailed description of the preferred embodiment thereof in connection with the attached drawings.

DETAILED DESCRIPTION OF THE PREFERRED EMBODIMENT

Figure 1:
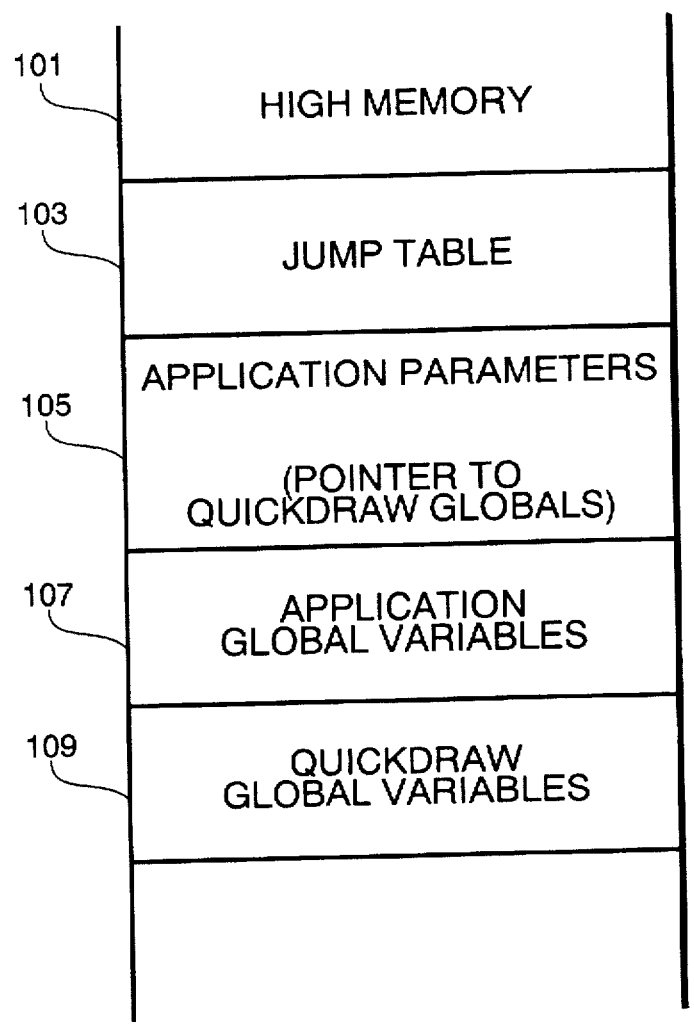
FIG. 1 is a diagram illustrating the arrangement of a memory including instruction codes for an application.

FIG. 1 illustrates the arrangement of a memory that stores an application program for a personal computer. As shown in FIG. 1, the application program codes include a jump table section 103, an application parameter section 105, and an application global variable section 107. If the application utilizes a drawing code resource such as QuickDraw, its global variables are stored in a QuickDraw global variable section 109 and are pointed to in the application parameter section 105. Table 1 shows C++ object oriented language instructions for a program using QuickDraw which includes a class Base and classes circle and square which are sub-classes of the class Base. The class Base includes publicly declared virtual functions Draw for drawing shapes and Calc for calculating features of shapes. The parameter elements x and y are data members used only in the class Base. The class circle is a sub-class of the class Base that includes the virtual function Draw which defines the drawing method for a circle that is different from the Draw method in the class Base and the class square is a sub-class of the class Base that includes the virtual function Draw which defines the drawing method for a square that is different than the drawing method for a circle.

TABLE 1

```
class      Base  {
   public:
           virtual   void Draw (void);
           virtual   void Calc (void);
   private:
           int   x;
           int   y;
};
class      circle : Base  {
   public:
           void Draw (void);
};
class      square : Base  {
   public:
           void Draw (void);
}
```

Figure 2:
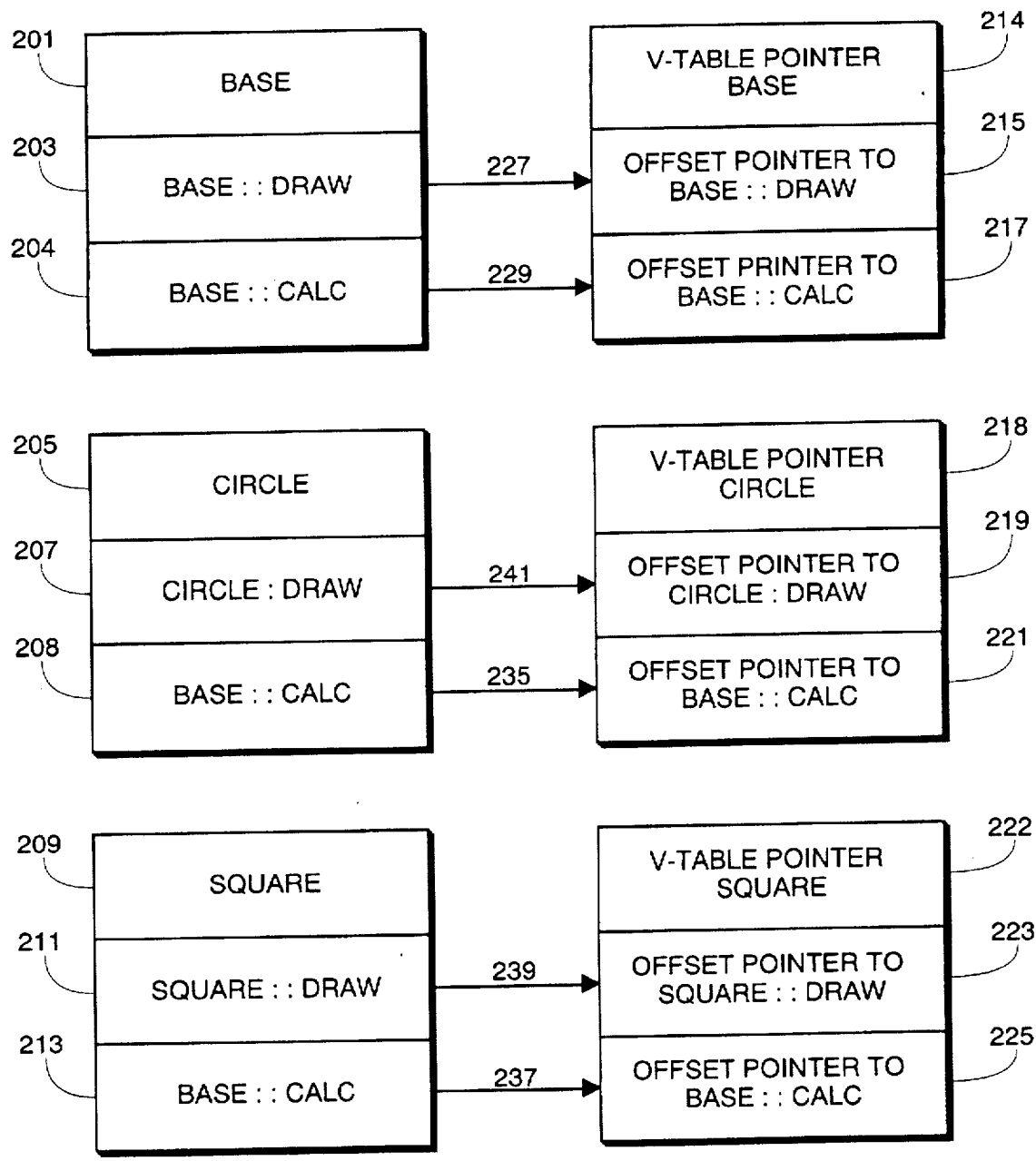
FIG. 2 is a diagram illustrating the v-table structure according to the invention.

In translating the C++ instructions to C object oriented instructions, virtual function tables (v-tables) are formed as shown in FIG. 2. Referring to FIG. 2, the class Base 201 includes the virtual functions Draw (Base::Draw) 203 and Calc (Base::Calc) 204. The class circle 205 includes the virtual functions Draw 207 (circle::Draw) and Calc 208 (Base::Calc) and the class square 209 includes the virtual functions Draw 211 (square::Draw) and Calc 213 (Base::Calc). A v-table is generated for each class which includes offset pointers to the virtual functions of the class. The v-table 214 for the class Base includes a memory address pointer 215 for codes of the virtual function Draw of Base (Base::Draw) and a memory address pointer 215 to codes for the virtual function Calc 217 of Base (Base::Calc). The v-table 218 for the class circle includes a pointer 219 to the codes for the virtual function Draw of the class circle (circle::Draw) and a pointer 221 to the codes for the virtual function Calc of the class Base. The v-table 222 for the class square includes a pointer 223 to the codes for the virtual function Draw of the class square (square::Draw) and a pointer 225 to the codes for the virtual function Calc of the class Base.

The virtual function Draw 203 of class Base makes references to the offset pointer 215 and the virtual function Calc of the class Base makes references to the offset pointer 217 as indicated by lines 227 and 229. The virtual functions Calc 208 of the class circle 205 and Calc 213 of the class square 209 use the same Calc function as the class Base. These Calc functions make references to the offset pointers 221 and 225 of the classes circle and square in their v-tables as indicated by lines 235 and 237. The Draw method of the class circle, however, is different from the Draw method of the class Base. Accordingly, the class circle 205 makes references to the offset pointer 219 in the v-table 218 of the class circle for the Draw function as indicated by the line 241. Similarly, the Draw method of the class square is different than the Draw methods of the classes Base and circle. The class square 209 makes references to the offset pointer 223 in the v-table 222 of the class square for the Draw function as indicated by the line 239.

Figure 3:
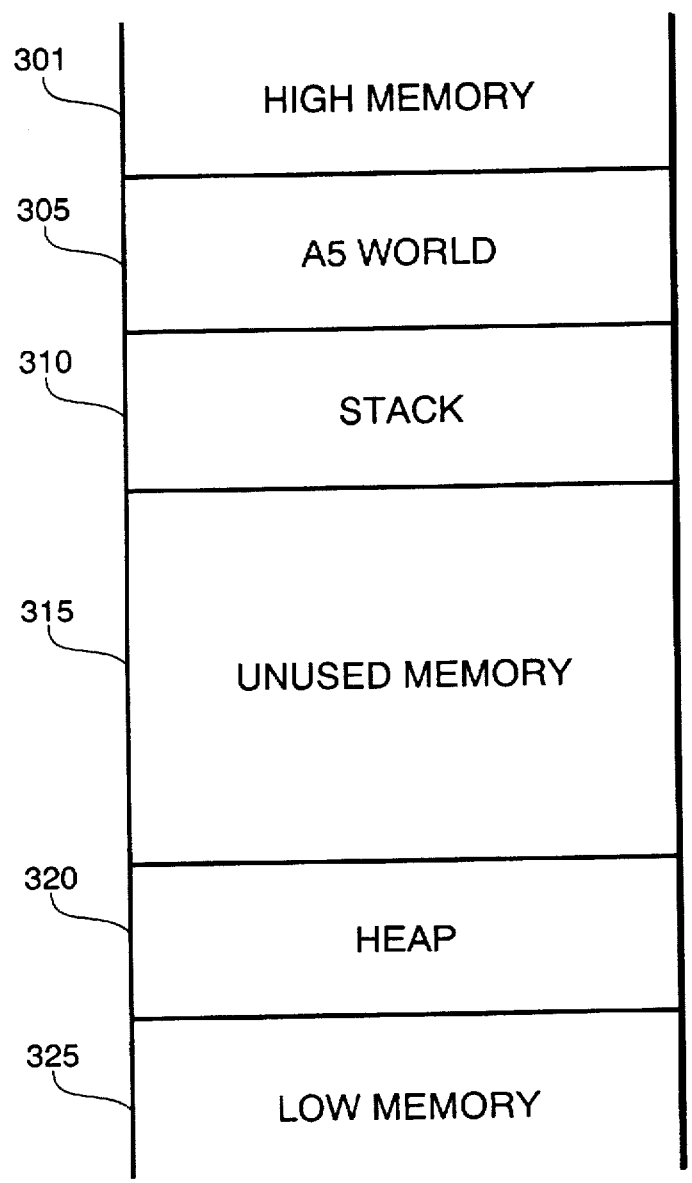
FIG. 3 illustrates the arrangement of a computer memory storing a compiled set of instruction codes for an application.

FIG. 3 shows diagrammatically the arrangement of an application program in a Macintosh type personal computer. In FIG. 3, the application instruction codes are located between a low memory 325 that stores the system programs and other resources used by the personal computer and a high memory 301. The memory structure of FIG. 3 includes an A5 world section 305 and a stack 310 for the application, an unused memory section 315 and a heap section 320. The heap section 320 is memory allocated to the program through calls which can be freed.

As is well known, the A5 world construction in the Macintosh type personal computer relies on the references to an A5 register in the microprocessor which points indirectly to several key data structures used by the Segment Loader manager which controls the loading and unloading of program segments of the application. The A5 register is used as a reference location to point to functions in the application. The compiler of the application generates A5-relative addressing modes to global variables and a linker resolves the actual offsets. In compilation, the Segment Loader allocates space for an A5 world for each application when the application is launched. Runtime code is linked to the front of the application which sets up A5 to point to the global variable space. Other types of personal computers use other similar constructions to provide references for locating application segments.

Stand-alone code, unlike an application, is not launched but is simply loaded and executed. Since there is no A5 world for stand alone code to reference locations, space is not readily allocated for the global variables and global variables cannot be readily defined. As a result, the conversion of a set of instructions for an application from the C++ object oriented language to the C language requires special provisions with respect to stand alone code. In accordance with the invention, the constructs relating to virtual functions in C++ instruction codes are detected and are automatically replaced with allocation constructs with references to related functions and a table of reference codes pointing to the related functions is generated. Advantageously, jump tables are formed for virtual functions and stand alone code resources without the need for specialized programming for each application or manual insertion of special code to provide stand alone code resources in the application.

Figure 4:
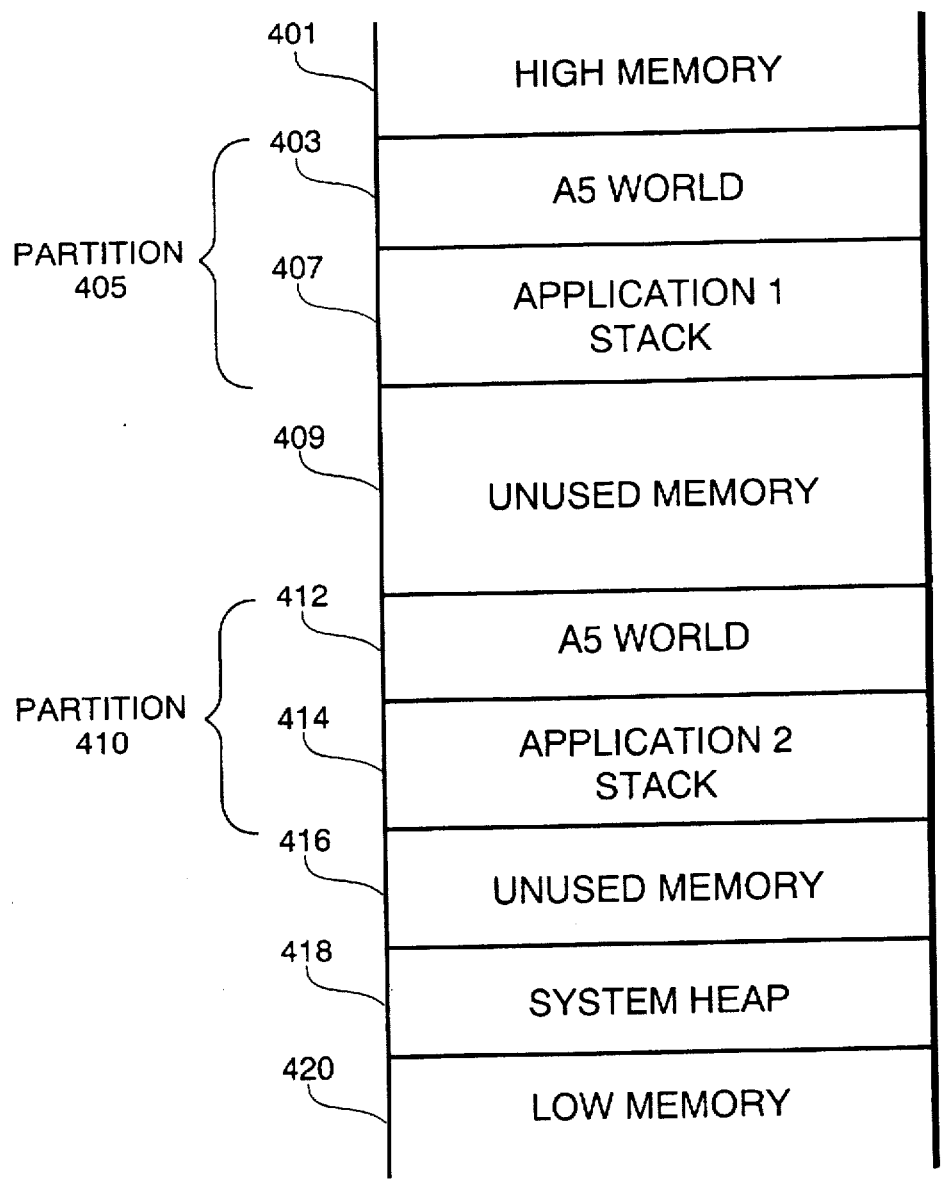
FIG. 4 illustrates the arrangement of a computer memory storing compiled sets of instruction codes for two applications.

FIG. 4 illustrates the configuration of a Macintosh personal computer memory for two applications. Referring to FIG. 4, there is shown a high memory section 401, a partition 405 which includes an A5 world section 403 and an Application 1 stack 407, an unused memory section 409, a partition 410 which includes an A5 world section 412 and an Application 2 section 414, an unused memory section 416, a system heap 418 and a low memory section 420. Each application section includes its own A5 world which provides a reference base for offsets of virtual functions. In this way, each of several independent applications in memory may be operated using its own allocation.

Figure 5:
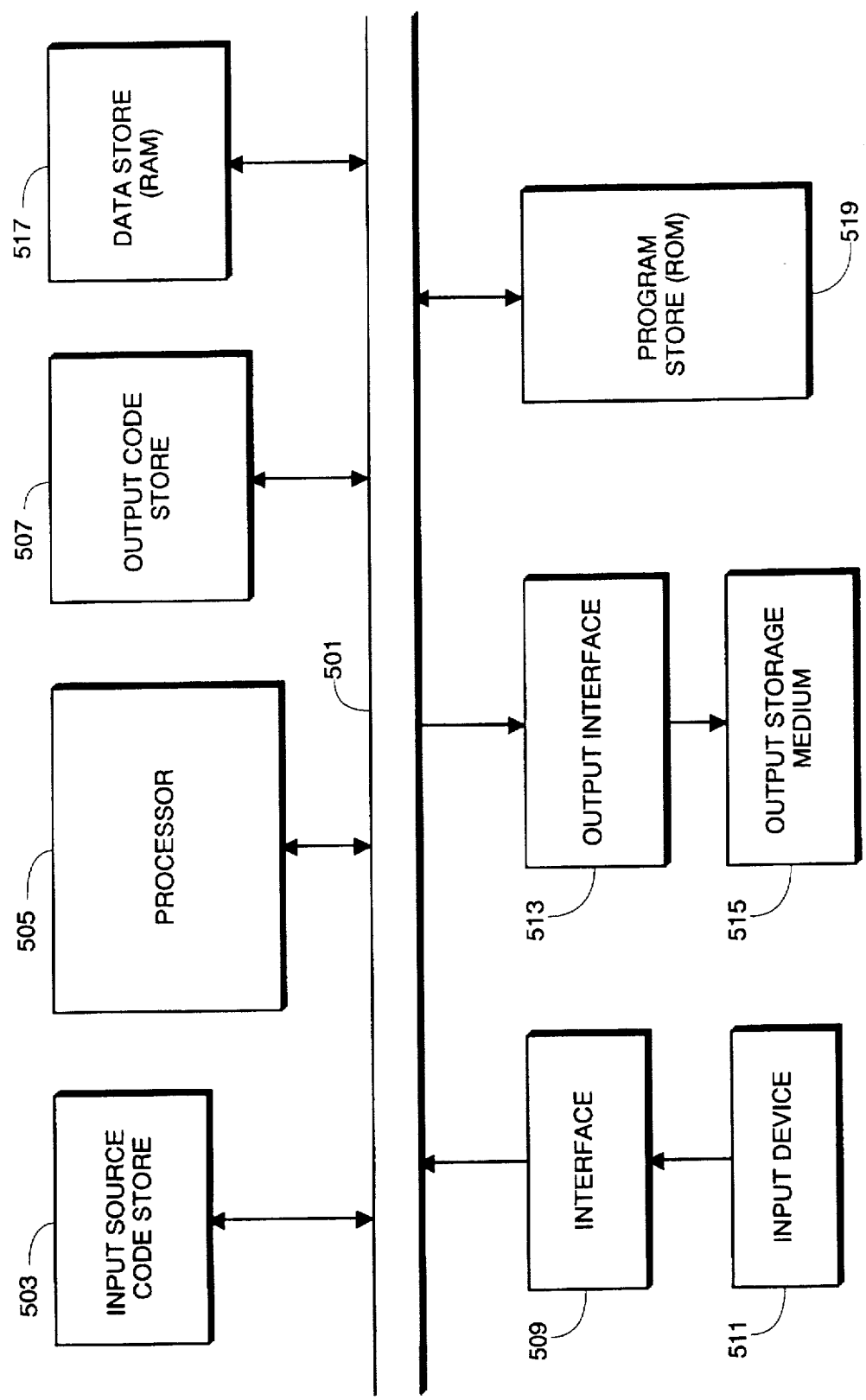
FIG. 5 is a block diagram of a processing system that is adapted to compile source codes of an object oriented language in accordance with an embodiment of the invention.

FIG. 5 depicts a general block diagram of a processing arrangement which may be used to compile and store instruction codes for computer applications. In the processing arrangement of FIG. 5, there is an input source code store 503, a processor 505, an output code store 507, a bus 501, an input interface 509, an input device 511, an output interface 513, an output storage medium 515, a data store 517 and a program store 519. The bus 501 interconnects the data store 517, the program store 519, the processor 505, the input source code store 503, the output code store 507, the input interface 509, and the output interface 513 so that information signals can be exchanged among these units. Input device 511 which may be a keyboard or a magnetic storage device is coupled through the input interface 509 to the bus 101 and the output storage medium 515 is coupled to the bus 501 through the output interface 513.

The instruction code conversion of the processing arrangement of FIG. 5 is performed in the processor 505 which is controlled by a set of instruction codes stored program memory 519. Data store 517 operates to store data required in the processing. In operation, signals corresponding to instruction records of an input object oriented language such as C++ from the input device 511 are inputted through the interface 509. The input instruction records may be manually inputted or inputted from a storage medium such as a magnetic disk. In the code conversion from the C++ object oriented language to the C object oriented language using the apparatus of FIG. 5, the inputted instruction record set is first stored in input source code store 503. A conversion program such as CFront (a C++ language translator that translates C++ to C available from AT&T) stored in program store 519 controls the processor 505 to translate the C++ language instruction records in the input source code store 503 to C language instruction records and to store the resulting C language instruction records in the data store 517. The C language instruction records produced by CFront include records that provide an implementation of virtual function tables. Table 2 shows the CFront instruction records implementing virtual function tables for global variables__vtbl__6square, __vtbl__6circle and__vtbl__4Base of the instruction code shown in Table 1 obtained from the translation.

TABLE 2

| | |
|---|---|
| 1 | struct __mptr __vtbl__6square[]={ |
| 2 | 0, 0, 0, |
| 3 | 0, 0, (__vptp)Draw__6squareFv, |
| 4 | 0, 0, (__vptp)Calc__4BaseFv, |
| 5 | 0, 0, 0 |
| 6 | }; |
| 7 | struct __mptr __vtbl__6circle[]={ |
| 8 | 0, 0, 0, |
| 9 | 0, 0, (__vptp)Draw__6circleFv, |
| 10 | 0, 0, (__vptp)Calc__4BaseFv, |
| 11 | 0, 0, 0 |
| 12 | }; |
| 13 | struct __mptr __vtbl__4Base[]={ |
| 14 | 0, 0, 0, |
| 15 | 0, 0, (__vptp)Draw__4BaseFv, |
| 16 | 0, 0, (__vptp)Calc__4BaseFv, |
| 17 | 0, 0, 0 |
| 18 | }; |

In order to support the generation of virtual function tables in a stand-alone code resource, it is necessary to provide linkers that generate jump tables for all code segments. The jump tables provide detailed information on the location of each function and its size. In accordance with the invention, the CFront generated instruction records are parsed to provide instruction records that allocate the virtual function tables and the virtual function tables are initialized.

Figure 6:
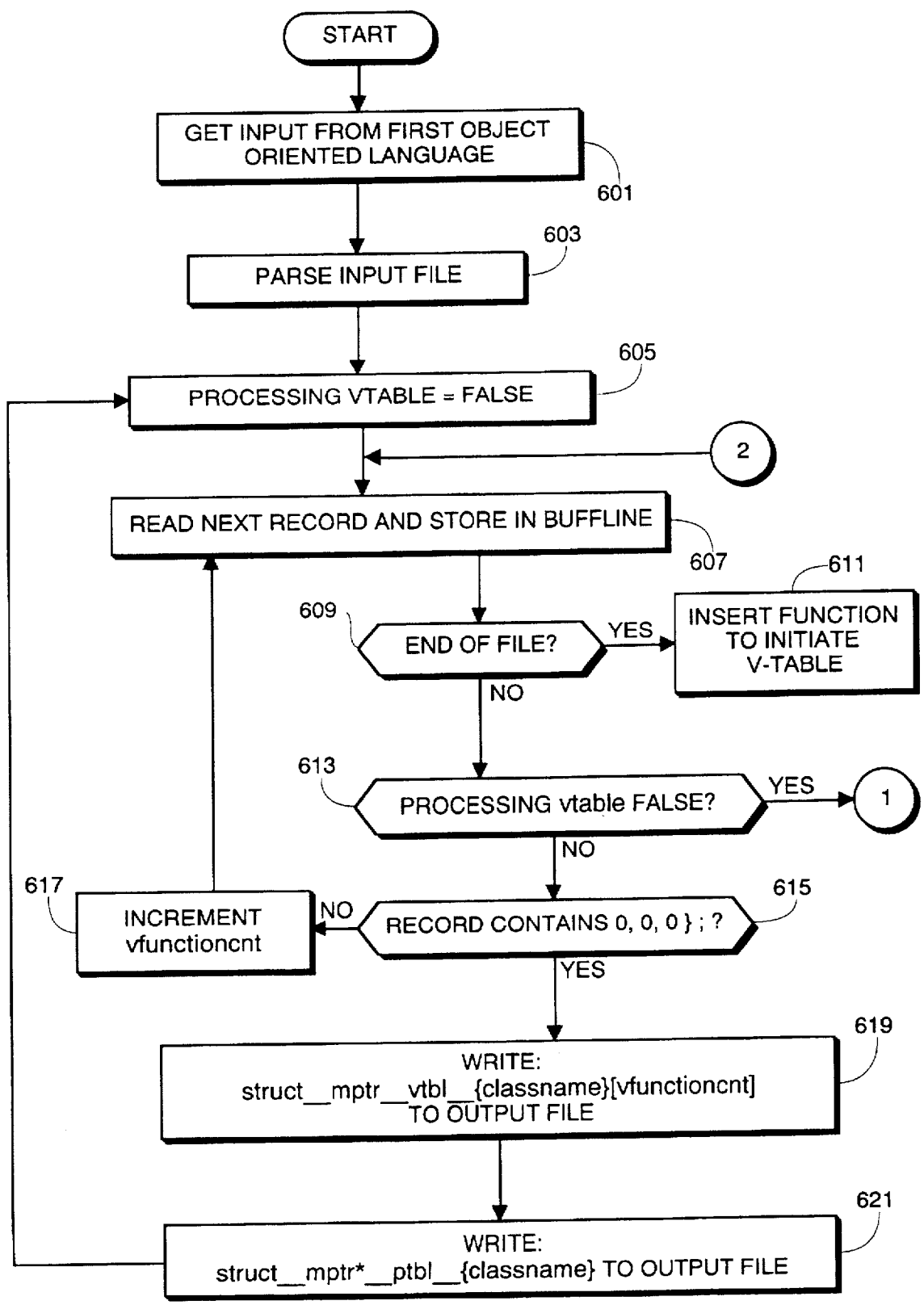
FIGS. 6 and 7 are flow charts showing the operations of the processor of FIG. 1 in converting a first object oriented language source code from the input store to a second object oriented language for storage in the output store according to an embodiment of the invention.
Figure 7:
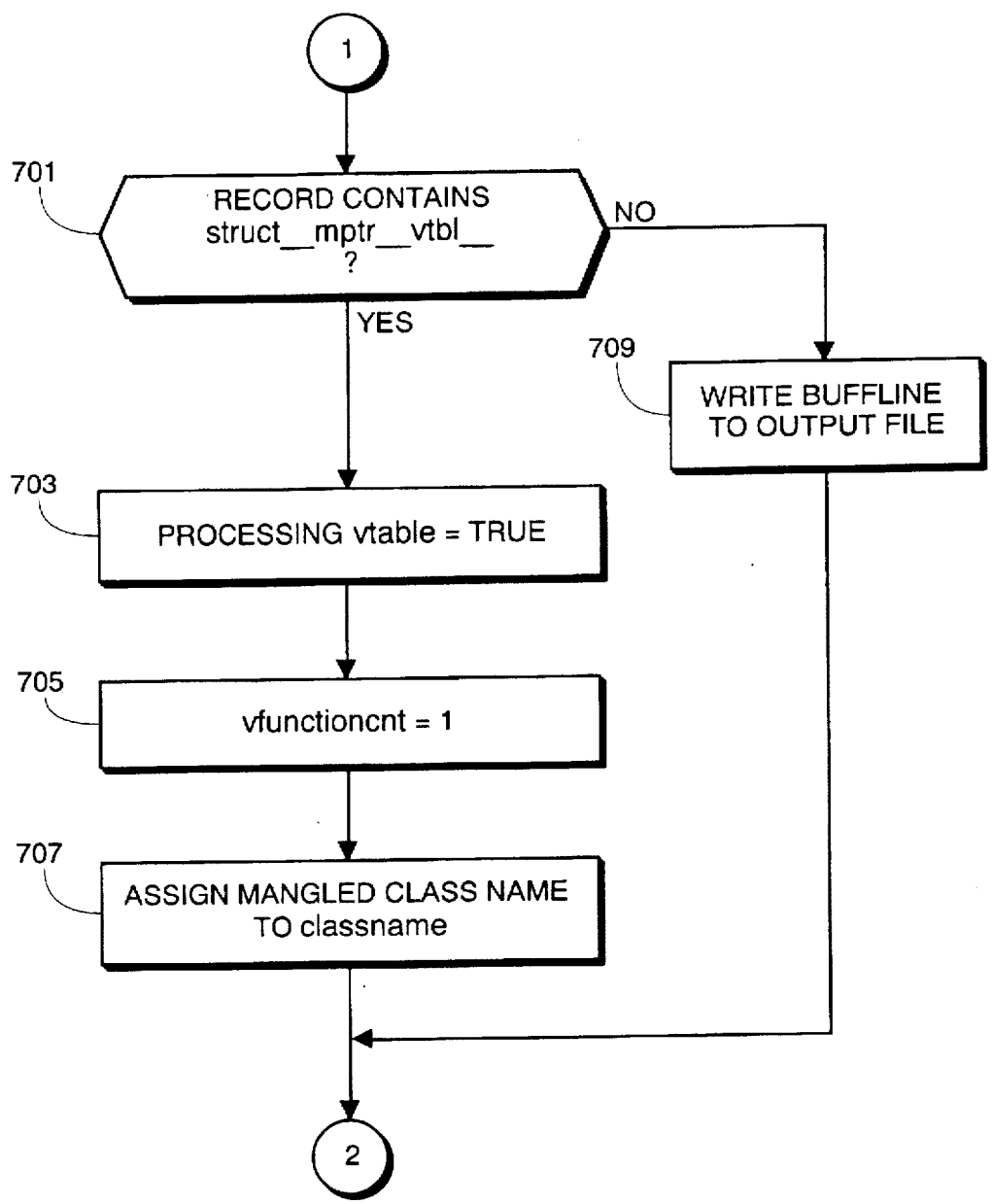

The code conversion operations in FIG. 5 are shown in the flow charts of FIGS. 6 and 7. The steps in FIGS. 6 and 7 correspond to the instructions stored in the program memory 519. Referring to the block diagram of FIG. 5 and the flow charts of FIGS. 6 and 7, the source instruction records in a first object oriented language are input through input device 513 and interface 509 and are stored in the input source code store 503. The instruction records obtained from the first object oriented language are inputted to the processor 505 in step 601 and are parsed in step 603. A processing v-table is then set to false in step 605 and the next record of the sequence is read by the processor 505 and stored in a buffer line of the processor 505 (step 607). Decision step 609 is then entered in which it is determined whether the end of file record has been reached. Until an end of file record is detected in step 609, decision step 613 is entered from step 609 and it is checked whether the processing v-table is false. When the processing v-table is false, step 701 of FIG. 7 is entered from the step 613 to detect whether the current record contains the construct "struct__mptr__vtbl__". If not, the current record in the buffer line is written to the output code store 507 and control is passed to step 607 of FIG. 6 in which the next record is read into the buffer line. If the construct "struct__mptr__vtbl__" is detected in step 701, the processing v-table is set to true (step 703), the variable vfunctioncnt is set to 1 and a distinguishing mangled class name is assigned to the class name in buffer line the record (step 707). The next record is then read into the buffer line in step 607.

The current record in the buffer line is checked to determine whether the end of file record has been reached (step 609). In the absence of the end of file record, the processing v-table is checked for a false value (step 613). When the processing v-table is true in step 613, the record is checked to determine whether it contains a "0, 0, 0};" construct indicative of a virtual function. If no, step 607 is reentered after the vfunctioncnt is incremented in step 617. Otherwise, the constructs
"struct__mptr__vtbl__{classname}[vfunctioncnt]" and "struct__mptr*__ptbl__{classname}" are outputted to the output code store 107. The construct
"struct__mptr__vtbl__{classname}[vfunctioncnt]" provides an allocation of the detected virtual function in the output code and the construct "struct__mptr*__ptbl__{classname}" provides additional information as to where the v-table is located. Control is then passed to step 605 in which the v-table is set to false. Step 607 is entered in which the next record is read. When the end of file record is detected in the decision step 609, the translation process shown in FIGS. 6 and 7 is completed and control is passed to the next process of the compilation in step 611.

Tables 2, 3 and 4 illustrate, by way of example, the allocation for virtual functions in a set of C++ instruction codes that are translated to C instruction codes by CFront and the initiation of the virtual functions. As noted, Table 2 shows virtual function tables implemented as global variables containing an array of function pointers generated by CFront. Global variables __vtbl__6square, __vtbl__6circle and__vtbl__4Base which have been translated into C code by CFront and which represent implementation of their respective virtual function tables are shown in table 2. To provide the jump tables for an application as shown in FIG. 1, the generated C source code of table 2 is parsed as described with respect to the flow charts of FIGS. 6 and 7.

With reference to FIGS. 6 and 7, the construct "struct__mptr__vtbl__" is detected in lines 1, 7 and 13 of table 2 in the step 701 of FIG. 7 and the construct "0, 0, 0}" is detected in lines 5 and 6, 11 and 12 and 17 and 18 of Table 2 in the step 615 of FIG. 6. Table 3 shows the replacement instruction records for instruction records of table 2 with the construct "0, 0, 0}". In FIGS. 6 and 7, the instruction records of lines 1 and 2 of Table 3 replace the allocation provided for the v-table allocation in lines 1–6 of Table 2. The instruction records of lines 3 and 4 of Table 3 replace the allocation provided for the v-table allocation in lines 7–12 of Table 2 and the instruction records of lines 5 and 6 of Table 3 replace the allocation provided for the v-table allocation in lines 13–18 of Table 2.

TABLE 3

| | |
|---|---|
| 1 | struct __mptr __vtbl__6square[4]; |
| 2 | struct __mptr *__ptbl__6square; |
| 3 | struct __mptr __vtbl__6circle[4]; |
| 4 | struct __mptr *__ptbl__6circle4 |
| 5 | struct __mptr __vtbl__4Base[4]; |
| 6 | struct __mptr *__ptbl__4Base; |

Table 4 shows the instructions of a C function according to the invention which initializes each entry into the virtual function table for the example of tables 2 and 3. The C function of table 4 provides run time binding of the virtual function table. By calling the C function of table 4 to initialize the virtual function tables prior to calls into a stand alone code resource, entries are provided into the stand alone code. According to the invention, virtual function tables are automatically generated during compilation after conversion of C++ instruction code sets to C language so that all virtual functions including those that use stand alone code resources in the C language code are supported.

TABLE 4

```
void Initialize__VTables__Shapes (void)
{
    /* className = 6square */
    memset (&__vtbl__6square, 0, sizeof (__vtbl__6square));
    __vtbl__6square[1].f = (__vptp)Draw__6squareFv;
    __vtbl__6square[2].f = (__vptp)Calc__4BaseFv;
    __ptbl__6square = __vtbl__6square;
    /* className = 6circle */
    memset (&__vtbl__6circle, 0, sizeof (__vtbl__6circle));
    __vtbl__6circle[1].f = (__vptp)Draw__6circleFv;
    __vtbl__6circle[2].f = (__vptp)Calc__4BaseFv;
    __ptbl__6circle = __vtbl__6circle;
    /* className = 4Base */
    memset (&__vtbl__4Base, 0, sizeof (__vtbl__4Base));
    __vtbl__4Base[1].f = (__vptp)Draw__4BaseFv;
    __vtbl__4Base[2].f = (__vptp)Calc__4BaseFv;
    __ptbl__4Base = vtbl__4Base;
}
```

While a preferred embodiment of the invention has been described, it is to be understood that the invention is not limited to the above described embodiments and that various changes and modifications may be made by those of ordinary skill in the art without departing from the spirit and scope of the invention.

What is claimed is:

1. A method for processing instruction records of an object oriented language comprising the steps of:

reading a sequence of instruction records of the object oriented language;

detecting instruction records in the sequence that include a predetermined construct;

replacing each detected instruction record with a set of replacement instruction records including storage location codes; and generating a table of codes pointing to storage locations, in response to a replacement in said replacing step, wherein when executed the table of codes generated in said generating step provides run time binding of a virtual function table.

2. The method of claim 1, wherein each detected instruction record is a global variable record.

3. The method of claim 2, wherein the generated table of codes pointing to storage locations includes codes pointing to storage locations of virtual functions of the global variables.

4. The method of claim 3, wherein the replacement instruction records include allocation instruction codes that allocate tables for the virtual functions of the global variables.

5. The method of claim 4 further comprising the step of initializing the virtual function tables.

6. The method of claim 4, wherein the allocated virtual function tables point to a stand-alone code resource.

7. The method of claim 1, further comprising the step of storing the replacement instruction codes and the table of storage location pointing codes in a storage medium.

8. In a system having an input instruction code store, a processor and an output code store, a method of converting instruction records of a first programming language to a second programming language comprising the steps of:

storing instruction records of the first programming language in the input code store;

translating the first language instruction records to a set of second language instruction records;

sequentially reading the second language instruction records to detect second language instruction records in the sequence that include a predetermined construct;

replacing each detected instruction record with a set of replacement instruction records including storage location codes; and generating a table of codes pointing to storage locations, in response to a replacement in said replacing step, wherein when executed the table of codes generated in said generating step provides run time binding of a virtual function table.

9. The method of claim 8, wherein the first programming language is a first object oriented programming language and the second language is a second object oriented programming language.

10. The method of claim 9, wherein each detected instruction record is a global variable record.

11. The method of claim 10, wherein the generated table of codes pointing to storage locations includes codes pointing to storage locations of virtual functions of the global variables.

12. The method of claim 11, wherein the replacement instruction records include allocation instruction codes that allocate tables for the virtual functions of the global variables.

13. The method of claim 11, wherein the allocated virtual function tables point to a stand-alone code resource.

14. The method of claim 9, further comprising the step of storing the replacement instruction codes and the table of storage location pointing codes in a storage medium.

15. The method of claim 8, further comprising the step of storing the replacement instruction codes and the table of storage location pointing codes in a storage medium.

16. A computer usable medium having computer readable program code means embodied therein comprising:
   first computer readable program code means for reading a sequence of instruction records of an object oriented language;
   second computer readable program code means for detecting instruction records in the sequence that include a predetermined construct;
   third computer readable program code means for replacing each detected instruction record with a set of replacement instruction records including storage location codes; and
   fourth computer readable program code means for generating a table of codes pointing to storage locations, in response to a replacement by said third computer readable program code means,
   wherein when executed the table of codes generated by said fourth computer readable program code means provides run time binding of a virtual function table.

17. The computer usable medium of claim 16, wherein each detected instruction record is a global variable record.

18. The computer usable medium of claim 18, wherein the replacement instruction records include allocation instruction codes that allocate tables for the virtual functions of the global variables.

19. The computer usable medium of claim 18, wherein the replacement instruction records include allocation instruction codes that allocate tables for the virtual functions of the global variables.

20. The computer usable medium of claim 18, wherein the allocated virtual function tables point to a stand-alone code resource.

21. The computer usable medium of claim 17, wherein each detected instruction record is a global variable record.

22. The computer usable medium of claim 17, further comprising computer readable program code means for storing the replacement instruction codes and the table of storage location pointing codes in a storage medium.

23. The computer usable medium of claim 16, further comprising computer readable program code means for storing the replacement instruction codes and the table of storage location pointing codes in a storage medium.

24. In a system that converts instruction records of a first programming language to a second programming language having an input instruction code store, a processor and an output code store, a computer usable medium having computer readable program code means embodied therein comprising:
   first computer readable program code means for storing instruction records of the first programming language in the input code store;
   second computer readable program code means for translating the first language instruction records to a set of second language instruction records;
   third computer readable program code means for sequentially reading the second language instruction records to detect second language instruction records in the sequence that include a predetermined construct;
   fourth computer readable program code means for replacing each detected instruction record with a set of replacement instruction records including storage location codes; and
   fifth computer readable program code means for generating a table of codes pointing to storage locations, in response to a replacement by said fourth computer readable program code means,
   wherein when executed the table of codes generated by said fourth computer readable program code means provides run time binding of a virtual function table.

25. The computer usable medium of claim 24, wherein the generated table of codes pointing to storage locations includes codes pointing to storage locations of virtual functions of the global variables.

26. The computer usable medium of claim 25 further comprising computer readable program code means for initializing the virtual function tables.

27. The computer usable medium of claim 25, wherein the allocated virtual function tables point to a stand-alone code resource.

28. The computer usable medium of claim 25, wherein the generated table of codes pointing to storage locations includes codes pointing to storage locations of virtual functions of the global variables.

29. The computer usable medium of claim 24, wherein the first programming language is a first object oriented programming language and the second language is a second object oriented programming language.

30. The computer usable medium of claim 24, further comprising computer readable program code means for storing the replacement instruction codes and the table of storage location pointing codes in a storage medium.

31. A method for processing instruction records of an object oriented language comprising the steps of:
   reading a sequence of instruction records of the object oriented language;
   detecting instruction records in the sequence that include a predetermined construct;
   replacing each detected instruction record with a set of replacement instruction records including storage location codes; and
   generating a table of codes pointing to storage locations, in response to a replacement in said replacing step,
   wherein the replacement instruction records are coded in the object oriented language used for the sequence read in said reading step.

32. The method of claim 31, wherein each detected instruction record is a global variable record.

33. The method of claim 32, wherein the generated table of codes pointing to storage locations includes codes pointing to storage locations of virtual functions of the global variables.

34. The method of claim 33, wherein the replacement instruction records include allocation instruction codes that allocate tables for the virtual functions of the global variables.

35. The method of claim 34 further comprising the step of initializing the virtual function tables.

36. The method of claim 34, wherein the allocated virtual function tables point to a stand-alone code resource.

37. The method of claim 31, further comprising the step of storing the replacement instruction codes and the table of storage location pointing codes in a storage medium.

38. A computer usable medium having computer readable program code means embodied therein comprising:
   first computer readable program code means for reading a sequence of instruction records of an object oriented language;
   second computer readable program code means for detecting instruction records in the sequence that include a predetermined construct;
   third computer readable program code means for replacing each detected instruction record with a set of replacement instruction records including storage location codes; and fourth computer readable program code means for generating a table of codes pointing to storage locations, in response to a replacement by said third computer readable program code means, wherein the replacement instruction records are coded in the object oriented language used for the sequence read by said first computer readable program code means.

39. The computer usable medium of claim 38, wherein each detected instruction record is a global variable record.

40. The computer usable medium of claim 39, wherein the generated table of codes pointing to storage locations includes codes pointing to storage locations of virtual functions of the global variables.

41. The computer usable medium of claim 40, wherein the replacement instruction records include allocation instruction codes that allocate tables for the virtual functions of the global variables.

42. The computer usable medium of claim 41 further comprising computer readable program code means for initializing the virtual function tables.

43. The computer usable medium of claim 41, wherein the allocated virtual function tables point to a stand-alone code resource.

44. The computer usable medium of claim 38, further comprising computer readable program code means for storing the replacement instruction codes and the table of storage location pointing codes in a storage medium.

* * * * *

UNITED STATES PATENT AND TRADEMARK OFFICE
CERTIFICATE OF CORRECTION

PATENT NO. : 5,764,991

DATED : June 9, 1998

INVENTOR(S): CHRISTOPHER JOHN CARCERANO          Page 1 of 2

It is certified that error appears in the above-identified patent and that said Letters Patent is hereby corrected as shown below:

COVER PAGE
 At [56] under OTHER PUBLICATIONS, "Skelhg, C/Ctt"
     should read --Skelly, C/C++--.

COLUMN 3
 Line 54, "pointer 215" should read --pointer 217--;
 Line 55, "Calc 217" should read --Calc--.

COLUMN 4
 Line 43, "AS" should read --A5--.

COLUMN 5
 Line 14, "interface 509." should read --interface 509--;
 Line 22, "stored" should read --stored in--.

UNITED STATES PATENT AND TRADEMARK OFFICE
CERTIFICATE OF CORRECTION

PATENT NO. : 5,764,991

DATED : June 9, 1998

INVENTOR(S) : CHRISTOPHER JOHN CARCERANO

It is certified that error appears in the above-identified patent and that said Letters Patent is hereby corrected as shown below:

<u>COLUMN 9</u>
Line 22, "claim 18," should read --claim 17,--.

Signed and Sealed this

Thirtieth Day of March, 1999

Attest:

Q. TODD DICKINSON

*Attesting Officer*   *Acting Commissioner of Patents and Trademarks*